(12) United States Patent
Park (10) Patent No.: US 12,001,222 B2
(45) Date of Patent: Jun. 4, 2024

(54) PLATOON CONTROL SYSTEM THAT PERFORMS STRING RECOMBINATION AFTER SEPARATION OF PLATOONING VEHICLES DUE TO EVENTS

(71) Applicants: HYUNDAI MOTOR COMPANY, Seoul (KR); KIA CORPORATION, Seoul (KR)

(72) Inventor: Se Young Park, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 228 days.

(21) Appl. No.: 17/320,821

(22) Filed: May 14, 2021

(65) Prior Publication Data

US 2022/0129009 A1 Apr. 28, 2022

(30) Foreign Application Priority Data

Oct. 27, 2020 (KR) .................. 10-2020-0140553

(51) Int. Cl.
| | |
|---|---|
| *B60W 10/04* | (2006.01) |
| *B60W 10/18* | (2012.01) |
| *B60W 10/20* | (2006.01) |
| *G05D 1/00* | (2006.01) |
| *G05D 1/02* | (2020.01) |
| *G08G 1/00* | (2006.01) |
| *G08G 1/0967* | (2006.01) |

(52) U.S. Cl.
CPC ........... *G05D 1/0295* (2013.01); *B60W 10/04* (2013.01); *B60W 10/18* (2013.01); *B60W 10/20* (2013.01); *G08G 1/0967* (2013.01); *G08G 1/22* (2013.01); *B60W 2520/10* (2013.01); *B60W 2554/4041* (2020.02)

(58) Field of Classification Search
CPC ........ G05D 1/0295; B60W 2554/4041; B60W 10/04; B60W 10/18; B60W 10/20; B60W 2520/10; G08G 1/0967; G08G 1/22
See application file for complete search history.

(56) References Cited

U.S. PATENT DOCUMENTS

| | | | |
|---|---|---|---|
| 2018/0188746 A1* | 7/2018 | Lesher | G05D 1/0287 |
| 2020/0298882 A1* | 9/2020 | Kobayashi | B60W 60/0025 |
| 2021/0031767 A1* | 2/2021 | Kim | B60Q 1/507 |
| 2021/0131813 A1* | 5/2021 | Chen | G05D 1/0027 |
| 2022/0007379 A1* | 1/2022 | Cao | H04W 72/02 |
| 2022/0292982 A1* | 9/2022 | Brandin | G08G 1/167 |
| 2023/0069005 A1* | 3/2023 | Oyanagi | B60W 30/165 |

* cited by examiner

*Primary Examiner* — Jess Whittington
*Assistant Examiner* — Rami Nabih Bedewi
(74) *Attorney, Agent, or Firm* — Lempia Summerfield Katz LLC (57) ABSTRACT

The present disclosure provides a platooning controller and a method thereof. The platooning controller includes a processor that, when a string is divided into an old string and a new string due to occurrence of an event during platooning, recombines the divided strings after the occurrence of the event is ended. The controller includes a storage storing data and an algorithm run by the processor. The processor determines a condition where it is possible to recombine the divided strings and controls recombination between the divided strings.

17 Claims, 4 Drawing Sheets

PLATOON CONTROL SYSTEM THAT PERFORMS STRING RECOMBINATION AFTER SEPARATION OF PLATOONING VEHICLES DUE TO EVENTS

CROSS-REFERENCE TO RELATED APPLICATION

This application claims the benefit of priority to Korean Patent Application No. 10-2020-0140553, filed in the Korean Intellectual Property Office on Oct. 27, 2020, the entire contents of which are incorporated herein by reference.

TECHNICAL FIELD

The present disclosure relates to a platooning controller for a vehicle and a method thereof, and more particularly, relates to technologies of dividing and recombining a platoon during platooning.

BACKGROUND

Platooning is a technology in which a plurality of vehicles performs autonomous driving in the state where they are arranged at a specified interval in line. When the plurality of vehicles is platooning, a leading vehicle which is a vehicle located in the frontline of a string may control one or more following vehicles which follow the leading vehicle.

The leading vehicle may maintain a gap between the plurality of vehicles included in the string and may exchange information about behaviors and situations of the plurality of vehicles included in the string using inter-vehicle communication.

SUMMARY

The present disclosure has been made to solve the above-mentioned problems occurring in the prior art while advantages achieved by the prior art are maintained intact.

An aspect of the present disclosure provides a platooning controller for determining a condition where it is possible to recombine divided platoons upon platoon division during platoon autonomous driving and automatically performing platoon recombination within the range of maintaining traffic flow to maintain advantages of platooning and a method thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a platooning controller may include a processor that, when a string is divided into an old string and a new string due to occurrence of an event during platooning, recombines the divided strings after the occurrence of the event is ended. The platooning controller also includes a storage storing data and an algorithm run by the processor. The processor may determine a condition where it is possible to recombine the divided strings and may control recombination between the divided strings.

In an embodiment, the condition where it is possible to recombine the divided strings may include at least one of: whether a platooning condition and an autonomous driving function are normal; a condition for a distance between the old string and the new string; a condition for a traffic congestion level; or a condition for the number of free lanes.

In an embodiment, the processor may determine whether the platooning condition and the autonomous driving function are normal, using at least one of whether there is an obstacle, whether a driving safety function operates, or whether the autonomous driving function operates.

In an embodiment, the processor may determine that the condition is met, when the distance between the old string and the new string is less than a predetermined value.

In an embodiment, the processor may determine that the condition is met, when the new string is within a distance where it is possible for the new string to reach the old string by accelerating and decelerating in a speed limit of a road where the new string is currently traveling or making a lane change.

In an embodiment, the processor may determine that the condition is not met, when the distance between the old string and the new string is greater than or equal to a predetermined value.

In an embodiment, the processor may determine that the condition is met when the traffic congestion level is smooth or normal, when the traffic congestion level is classified as being smooth, normal, or delayed.

In an embodiment, the processor may determine that the condition is met, when the number of free lanes is greater than or equal to a predetermined number.

In an embodiment, the processor may notify a user that a recombination function is enabled and may receive consent from the user, when it is determined that the condition is met.

In an embodiment, the processor may determine an amount of steering control, an amount of driving control, and an amount of braking control of platooning vehicles of the old string and the new string based on at least one of a location, a driving speed, a lane, or platoon information of each of the platooning vehicles of the old string and the new string, when controlling the recombination.

In an embodiment, the processor may control the new string to reach the old string and perform the recombination when there is no new vehicle between the old string and the new string, when controlling the recombination.

In an embodiment, the processor may determine whether it is possible for a new vehicle to merge with a string, when there is the new vehicle between the old string and the new string.

In an embodiment, the processor may determine whether it is possible for the new vehicle to merge with the string, based on at least one of sameness between the remaining driving path of the new vehicle and the remaining driving path of the string, consent of a user of the new vehicle or consent of an unmanned system, or satisfaction of performance of a system capable of performing platoon autonomous driving.

In an embodiment, the processor may control the new string to include the new string and be recombined with the old string, when it is possible for the new vehicle to merge with the string.

In an embodiment, the processor may control the new string to avoid the new vehicle by making a lane change and be recombined with the old string, when it is impossible for the new vehicle to merge with the string.

In an embodiment, the processor may control a leading vehicle of the new string to play a role as a leading vehicle of the recombined string or may reselect a leading vehicle, when there is no new vehicle between the old string and the new string, but when the new string is traveling in front of the old string.

In an embodiment, the processor may control a leading vehicle of the old string to play a role as a leading vehicle of the recombined string, after the recombination between the old string and the new string is completed.

According to an aspect of the present disclosure, a platooning control method may include: determining whether occurrence of an event is ended, when a string is divided into an old string and a new string due to the occurrence of the event during platooning; determining a condition where it is possible to recombine the divided strings, after the occurrence of the event is ended; and controlling recombination between the divided strings, when the condition is met.

In an embodiment, the determining of the condition may include determining that the condition is met, when at least one of: whether a platooning condition and an autonomous driving function are normal is met; a condition for a distance between the old string and the new string is met; a condition for a traffic congestion level is met; or a condition for the number of free lanes is met.

In an embodiment, the platooning control method may further include notifying a user that a recombination function is enabled and receiving consent from the user, when it is determined that the condition is met.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions have been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art. Such terms should not be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operation, function, or the like.

An embodiment of the present disclosure discloses technologies of dividing a string to perform independent driving control upon occurrence of a situation which needs to divide the string depending on an internal factor or an external factor during platooning, determining a condition where it is possible to recombine the divided strings after a sudden situation is ended, and performing platoon recombination when the condition is met.

Hereinafter, embodiments of the present disclosure are described in detail with reference to FIGS. 1-4.

A leading vehicle LV and a following vehicle FV included in a platooning group may perform platooning on the road. The leading vehicle LV and the following vehicle FV may travel while maintaining a specified distance. While driving, the leading vehicle LV or the following vehicle FV may adjust a distance between the leading vehicle LV and the following vehicle FV. The leading vehicle LV or the following vehicle FV may increase or decrease an inter-vehicle distance depending on manipulation of a driver.

Figure 1:
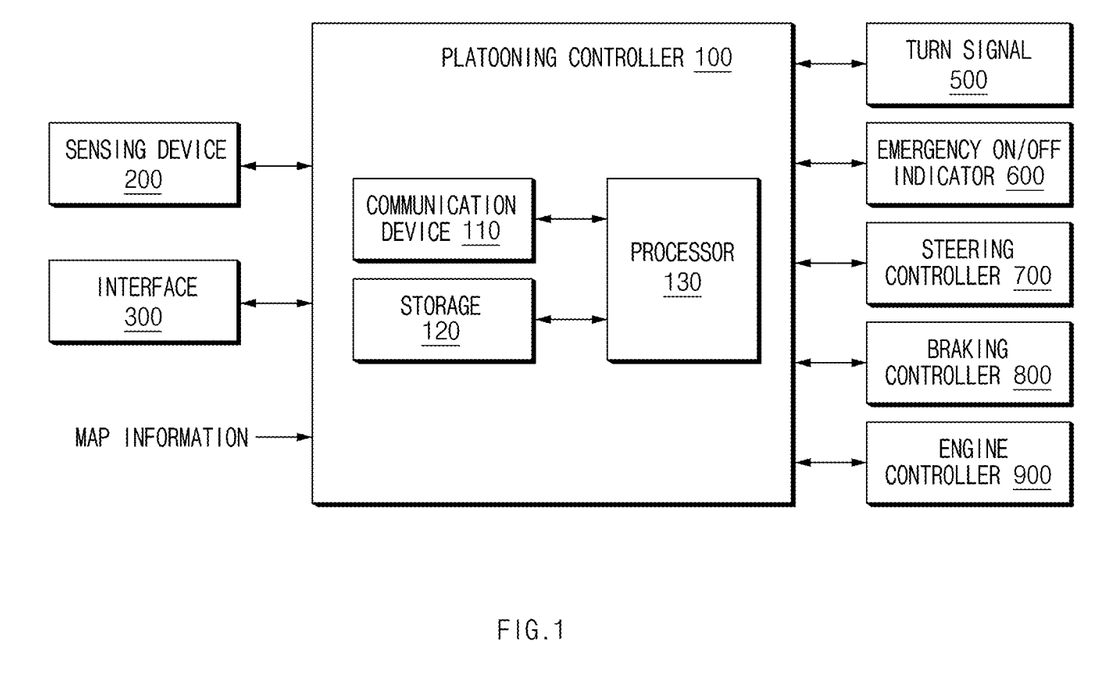
FIG. 1 is a block diagram illustrating a configuration of a vehicle system including a platooning controller according to an embodiment of the present disclosure.

FIG. 1 is a block diagram illustrating a configuration of a vehicle system including a platooning controller according to an embodiment of the present disclosure.

Referring to FIG. 1, the vehicle system may include a platooning controller 100, a sensing device 200, an interface 300, a turn signal 500, an emergency ON/OFF indicator 600, a steering controller 700, a braking controller 800, and an engine controller 900.

The platooning controller 100 according to an embodiment of the present disclosure may be implemented in a vehicle. In this case, the platooning controller 100 may be integrally configured with control units in the vehicle or may be implemented as a separate device to be connected with the control units of the vehicle by a separate connection means.

The platooning controller 100 may divide a string due to occurrence of an event situation, such as an obstacle, when platooning vehicles are platooning, and may perform platoon recombination after the event situation is ended to continue performing old platooning.

The platooning controller 100 of a new leading vehicle may control to avoid an obstacle or the like. In this case, a situation which needs to divide the string to travel may include at least one of occurrence of an obstacle in the string due to departure of a payload of the leading vehicle during platooning, a breakdown of a vehicle in the string, or occurrence of a surrounding vehicle which attempts to make a lane change to a lane where the string is traveling.

The autonomous controller 100 according to an embodiment of the present disclosure, which performs the above-mentioned operations, may be implemented in the form of an independent hardware device including a memory and a processor for processing each operation or may be driven in the form of being included in another hardware device such as a microprocessor or a universal computer system.

The platooning controller 100 may include a communication device 110, a storage 120, and a processor 130.

The communication device 110 may be a hardware device implemented with various electronic circuits to transmit and receive a signal through a wireless or wired connection. In an embodiment of the present disclosure, the communication device 110 may perform a network communication technology in the vehicle and may perform vehicle-to-infrastructure (V2I) communication with a server, an infrastructure, or another vehicle outside the vehicle using a wireless Internet technology or a short range communication technology. Herein, the network communication technology in the vehicle may be to perform inter-vehicle communication through controller area network (CAN) communication, local interconnect network (LIN) communication, flex-ray communication, or the like. Furthermore, the wireless Internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra-wideband (UWB), radio frequency identification (RFID), infrared data association (IrDA), or the like.

As an example, the communication device 110 may share platooning information between vehicles in a string. In this case, the platooning information may include information associated with departing from the string, information associated with generating a new string, a location of a vehicle, a speed of the vehicle, destination information, platoon recombination information, or the like.

The storage 120 may store a sensing result of the sensing device 200, vehicle information of vehicles in the string, which is received by the communication device 110, data obtained by the processor 130, or data, an algorithm, and/or the like necessary for an operation of the processor 130.

As an example, the storage 120 may store information about a location of the vehicle and information about a forward road, which are received via a navigation device (not shown) or the like, and platooning information or the like. Furthermore, the storage 120 may store positioning information of a forward vehicle, vehicle speed information, or the like, which is received through vehicle-to-everything (V2X) communication. Furthermore, the storage 120 may store information about a forward obstacle, for example, a forward vehicle, which is detected by the sensing device 200.

Furthermore, the storage 120 may store location and size information of an obstacle or location and speed information of a surrounding vehicle, which is obtained by the sensing device 200, and may store a command, an algorithm, and/or the like for independent driving control.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, or the like and may electrically control the respective components. The processor 130 may be an electrical circuit which executes instructions of software and may perform a variety of data processing and calculation described below. The processor 130 may be, for example, an electronic control unit (ECU), a micro controller unit (MCU), or another sub-controller, which is loaded into the vehicle.

Upon occurrence of a situation which needs to divide a string to travel when a leading vehicle and following vehicles are platooning, when the string is divided to travel, the processor 130 may determine a probability of platoon recombination and may perform the platoon recombination to maintain old platooning.

Upon occurrence of an event, for example, occurrence of an obstacle in a string due to departure of a payload of a leading vehicle during platooning, a breakdown of a vehicle in the string, or occurrence of a surrounding vehicle which attempts to make a lane change to a lane where the string is traveling, the processor 130 may divide the string.

In other words, some vehicles in an old string may be divided to generate one or more new strings. In this case, the new strings in two rows including following vehicles behind an obstacle may be generated, or the two new strings may be generated for each row.

When the event situation is ended after dividing the string, the processor 130 may determine a probability of platoon recombination. In other words, after the event situation is ended, when a platooning condition, a state of an autonomous driving function, a condition for a distance between an old string and a new string, a condition for a traffic congestion level based on navigation, a condition for the number of free lanes, or the like is met, the processor 130 may determine the current state as a state where it is possible to perform platoon recombination.

The processor 130 may determine whether the platooning condition and the autonomous driving function are normal, using at least one of whether there is an obstacle, whether a driving safety function (e.g., forward collision-avoidance assist (FCA)) operates, or whether the autonomous driving function operates.

When the distance between the old string and the new string is less than a predetermined value, the processor 130 may determine that the condition where it is possible to recombine divided strings is met.

When the new string is within a distance where it is possible for the new string to reach the old string by accelerating and decelerating in the speed limit of the road where the new string is traveling or making a lane change, the processor 130 may determine that the condition where it is possible to recombine the divided strings is met.

When the traffic congestion level is classified as being smooth, normal, or delayed, the processor 130 may determine that the condition where it is possible to recombine the divided strings is met when the traffic congestion level is smooth or normal.

When the number of free lanes is greater than or equal to a predetermined number, the processor 130 may determine that the condition where it is possible to recombine the divided strings is met.

When it is determined that the current state is the state where it is possible to perform the platoon recombination, the processor 130 may notify a user that a recombination function is enabled by means of the interface 300 and may request and receive user consent.

Upon recombination control, the processor 130 may determine the amount of steering control, the amount of driving control, and the amount of braking control of platooning vehicles of the old string and the new string based on at least one of a location, a driving speed, a lane, or platoon information of each of the platooning vehicles of the old string and the new string.

Figure 2:
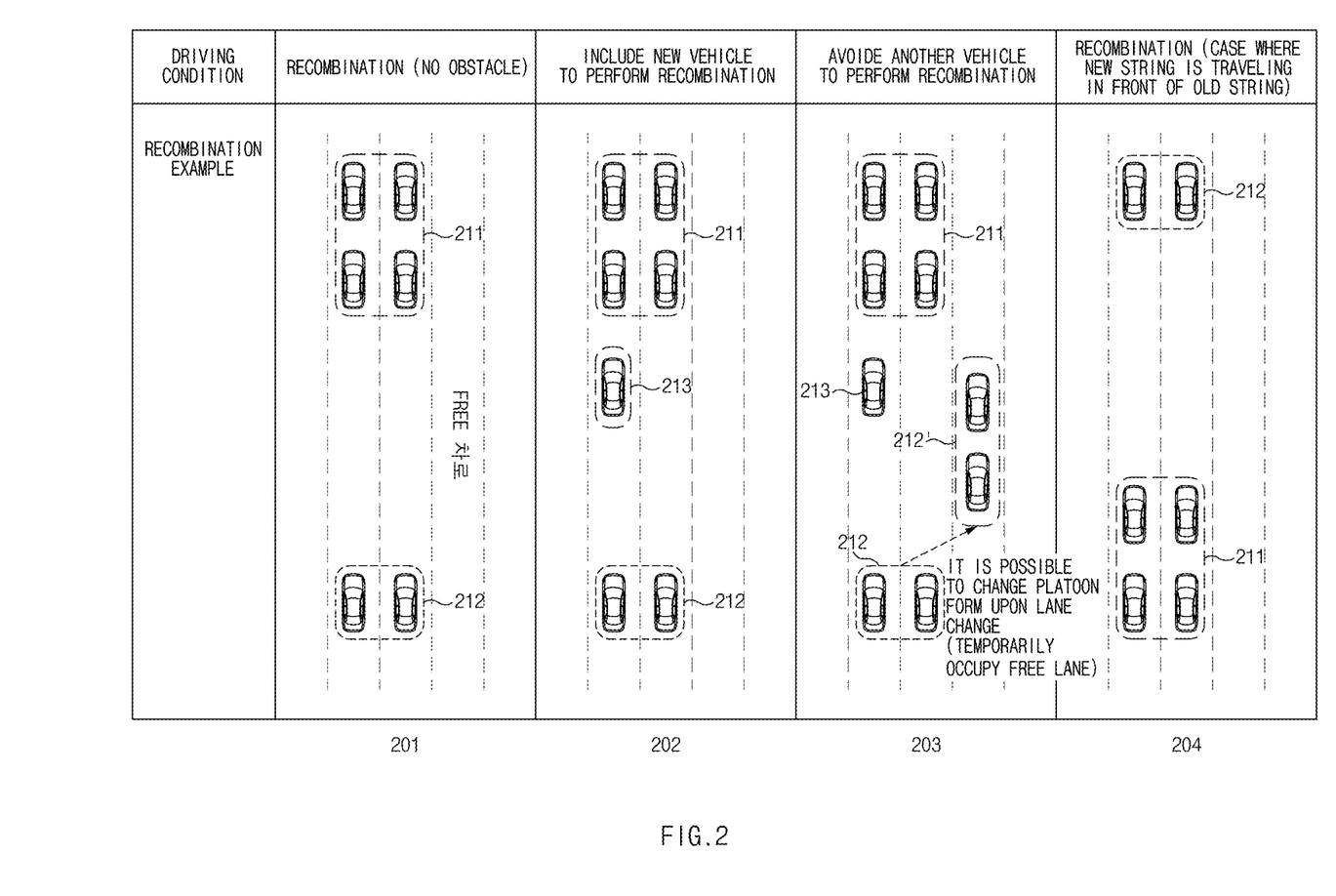
FIG. 2 is a drawing illustrating a view of division and recombination control during platooning according to an embodiment of the present disclosure.

Upon recombination control, when there is no new vehicle between the old string and the new string, the processor 130 may control the new string to reach the old string and perform recombination. FIG. 2 is a drawing illustrating a view of division and recombination control during platooning according to an embodiment of the present disclosure. Referring to reference numeral 201 of FIG. 2, when there is no obstacle between an old string 211 and a new string 212, the new string 212 may approach the old string 211 to perform recombination.

When there is a new vehicle between the old string and the new string, a processor 130 of FIG. 1 may determine whether it is possible for the new vehicle to merge with the string.

The processor 130 may determine whether it is possible for the new vehicle to merge with the string, based on at least one of sameness between the remaining driving path of the new vehicle and the remaining driving path of the string, consent of a user of the new vehicle or consent of an unmanned system, or satisfaction of performance of a system capable of performing platoon autonomous driving.

When it is possible for the new vehicle to merge with the string, the processor 130 may control the new string to include the new vehicle and be recombined with the old string. Referring to reference numeral 202 of FIG. 2, when there is a new vehicle (an obstacle) 213 between the old string 211 and the new string 212 and when it is possible to include the new vehicle 213 on the path, the new string 212 may be recombined with the old string 211 together with the new vehicle 213 when the new string 212 approaches the old string 211.

When it is impossible for the new vehicle to merge with the string, the processor 130 may control the new string to avoid the new vehicle and be recombined with the old string by making a lane change. As shown reference numeral 203 of FIG. 2, the new string 212 may avoid the new vehicle 213 to make a lane change to a free lane (see reference numeral 212') and may be recombined with the old string 211.

Referring to reference numeral 204 of FIG. 2, when there is no new vehicle between the old string 211 and the new string 212, but when the new string 212 is traveling in front of the old string 211, the processor 130 may control a leading vehicle of the new string 212 to play a role as a leading vehicle of the recombined string or may reselect a leading vehicle.

After completing the recombination between the old string and the new string, the processor 130 may control a leading vehicle of the old string to play a role as a leading vehicle of the recombined string.

A sensing device 200 of FIG. 1 may include a vehicle outside information sensor for sensing information outside the vehicle and a vehicle inside information sensor for obtaining information inside the vehicle. The sensor device 200 may include one or more sensors which detect an obstacle, for example, a preceding vehicle, located around the vehicle and measure a distance from the obstacle and/or a relative speed of the obstacle.

The sensing device 200 may have a plurality of sensors to sense objects outside the vehicle and may obtain information about a location of the object, a speed of the object, a movement direction of the object, and/or a type (e.g., a vehicle, a pedestrian, a bicycle, a motorcycle, or the like) of the object. To this end, the sensing device 200 may include an ultrasonic sensor, a radar, a camera, a laser scanner and/or a corner radar, a light detection and ranging (LiDAR), an acceleration sensor, a yaw rate sensor, a torque sensor and/or a wheel speed sensor, a steering angle sensor, or the like.

An interface 300 of FIG. 1 may include an input means for receiving a control command from a user and an output means for outputting an operation state, an operation result, or the like of the platooning controller 100.

The interface 300 may output platooning information or may receive feedback from a user on the output screen. For example, the feedback may include platooning approval, recombination approval, or the like. The interface 300 may be implemented as a head up display (HUD), a cluster, an audio video navigation (AVN), a human machine interface (HMI), a user setting menu (USM), or the like.

Herein, the input means may include a key button and may further include a mouse, a joystick, a jog shuttle, a stylus pen, or the like. Furthermore, the input means may further include a soft key implemented on a display.

The output means may include the display and may further include a voice output means such as a speaker. In this case, when a touch sensor such as a touch film, a touch sheet, or a touch pad is provided in the display, the display operates as a touchscreen and may be implemented in a form where the input means and the output means are integrated with each other.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

As an example, the output means may display platooning information. In this case, the platooning information may include a platooning change item, such as information associated with generating a string or information associated with releasing the string, information associated with generating a new string, information about a forward obstacle, information about an avoidance path, information about a lane change path, or the like.

A turn signal 500 of FIG. 1 may be controlled by the platooning controller 100 to be turned on, upon a lane change. In other words, the turn signal 500 of a direction to be changed may be turned on.

An emergency ON/OFF indicator 600 of FIG. 1 may turn on/off hazard lights in a critical situation or the like to warn a following vehicle.

A steering controller 700 of FIG. 1 may be configured to control a steering angle of the vehicle and may include a steering wheel, an actuator interlocked with the steering wheel, and a controller for controlling the actuator.

A braking controller 800 of FIG. 1 may be configured to control braking of the vehicle and may include a controller for controlling a brake.

An engine controller 900 of FIG. 1 may be configured to control to drive an engine of the vehicle and may include a controller for controlling a speed of the vehicle.

As such, an embodiment of the present disclosure may divide a string to travel to avoid an obstacle due to occurrence of an event (the obstacle or the like) during platoon autonomous driving and may perform platoon recombination when the event situation is ended to maintain the platooning. Thus, platoon division and combination within a range may be freely controlled where traffic flow is maintained to increase efficiency of the platooning.

Figure 3:
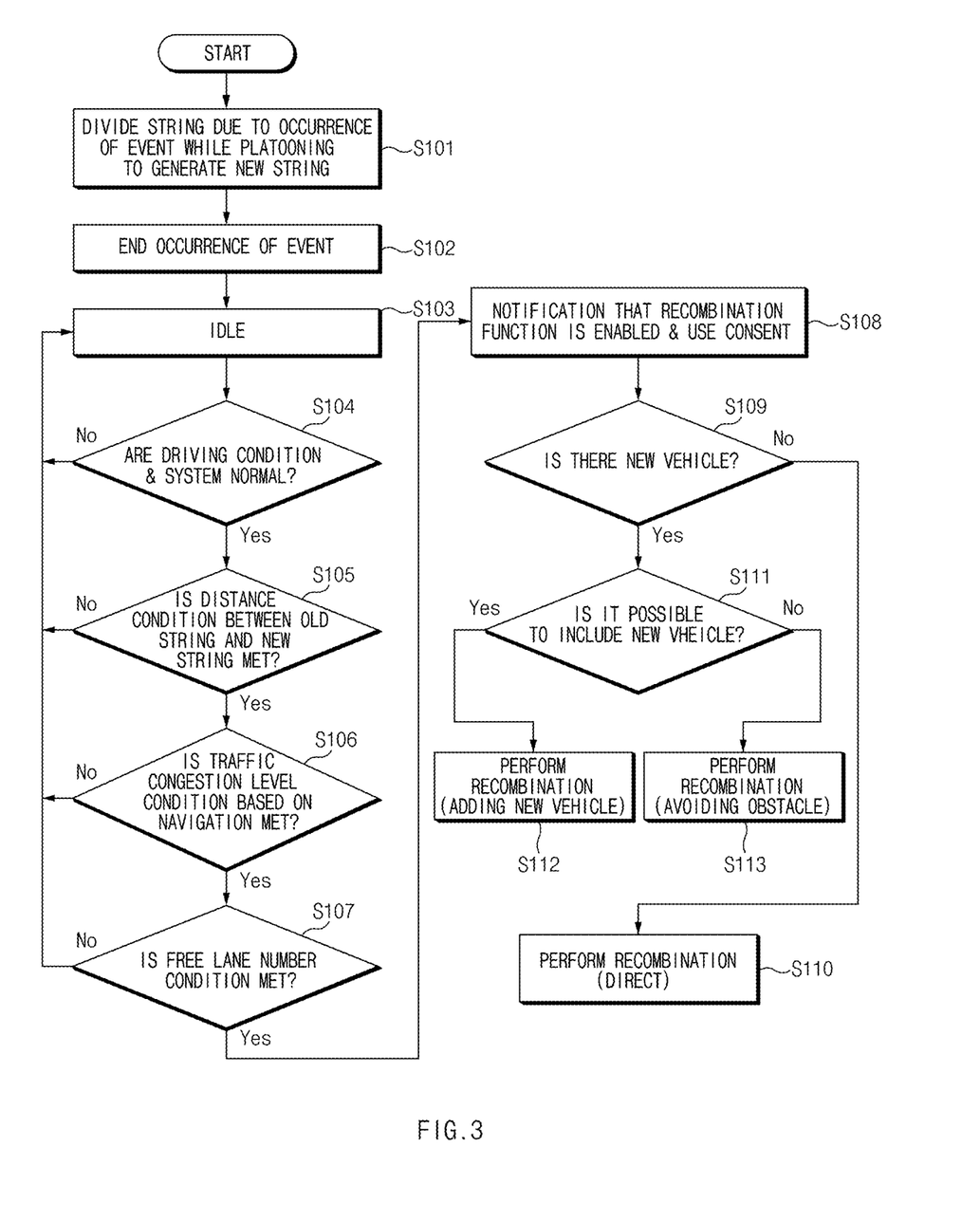
FIG. 3 is a flowchart illustrating a platooning control method according to an embodiment of the present disclosure.

Hereinafter, a description is given in detail of a platooning control method according to an embodiment of the present disclosure with reference to FIG. 3. FIG. 3 is a flowchart illustrating a platooning control method according to an embodiment of the present disclosure, which illustrates a method for dividing a platoon to travel due to occurrence of an event situation and performing platoon recombination when the event situation is ended.

Hereinafter, it is assumed that a platooning controller 100 of FIG. 1 performs a process of FIG. 3. Furthermore, in a description of FIG. 3, an operation described as being performed by an apparatus may be understood as being controlled by a processor 130 of the platooning controller 100 loaded into each of a leading vehicle of a new string and a leading vehicle of an old string. When a platoon is divided to travel, all following vehicles except for a leading vehicle of a current string become a leading vehicle of a new string. When the old string and the new string are combined, a leading vehicle of the old string may become a leading vehicle of all platooning vehicles.

Referring to FIG. 3, in S101, the apparatus may divide a platoon due to occurrence of an event during platooning to form a new string.

When the occurrence of the event is ended in S102, in S103, the apparatus may maintain an idle state.

In S104, the apparatus may determine whether a platooning condition and an autonomous driving function are in a normal state. In this case, when an obstacle or a forward collision-avoidance assist (FCA) condition does not occur, the apparatus may determine that the platooning condition is in the normal state. Furthermore, the apparatus may determine whether the autonomous driving function, for example, a driving convenience function (e.g., smart cruise control (SCC)) or a driving safety function (e.g., FCA, lane following assist (LFA), or the like) operates normally.

When the platooning condition and the autonomous driving function are in the normal state in S104, in S105, the apparatus may determine whether a condition for a distance between an old string and a new string is met.

In other words, the apparatus may determine whether the new string is within a distance where it is possible for the new string to reach the old string by accelerating and decelerating in the speed limit of the road where the new string is traveling or making a lane change to determine a condition where it is possible to perform platoon recombination. In other words, when the new string is within the distance where it is possible for the new string to reach the old string by accelerating and decelerating in the speed limit of the road where the new string is traveling or making the lane change, the apparatus may determine that it is possible to perform the platoon recombination.

Furthermore, the apparatus may determine whether the distance between the old string and the new string is greater than or equal to a predetermined distance to determine a possibility of platoon recombination. For example, when the distance between the old string and the new string is within 300 m, the apparatus may determine that the distance condition for platooning recombination is met.

When the condition for the distance between the old string and the new string is met in S105, in S106, the apparatus may determine whether a condition for a traffic congestion level based on navigation is met. In other words, an embodiment of the present disclosure may limit the condition where it is possible to perform the platoon recombination using the traffic congestion level to prevent traffic congestion from increasing due to the platoon recombination process. The apparatus may classify the traffic congestion level as being smooth, normal, or delayed and may determine that the condition for the traffic congestion level for platoon recombination is met, when the traffic congestion level is smooth or normal.

When the condition for the traffic congestion level based on the navigation is met in S106, in S107, the apparatus may determine whether a condition for the number of free lanes is met. In other words, the apparatus may determine the condition whether it is possible to perform the platoon recombination using whether a free lane is obtained to prevent traffic congestion from increasing due to the platoon recombination process. Herein, the free lane may refer to a platoon free lane which is not occupied by the old string and the new string. Herein, temporary occupation for a lane change may be an exceptional condition.

For example, when the road is a two- or three-lane road, the apparatus may determine that it is possible to perform platoon recombination when a minimum of one or more free lanes is obtained.

Furthermore, when the road is a four-lane or more road, the apparatus may determine that it is possible to perform platoon recombination when a minimum of n/2 or more free lanes is obtained. For example, when the road is the four-lane or more road, the apparatus may determine that it is possible to perform platoon recombination when a minimum of n/2 or more free lanes is obtained, for example, when three lanes or more free lanes are obtained on a six-lane road.

When at least one of the conditions in S104 to S107 is not met, in S103, the apparatus may return to the idle state. When the condition for the distance between the old string and the new string is not met in S105, the apparatus may end the recombination logic.

As described above, when the platooning condition and the autonomous driving function are in the normal state, when the condition for the distance between the old string and the new string is met, when the condition for the traffic congestion level based on the navigation is met, and when the condition for the number of free lanes is met, in S108, the apparatus may provide a notification that the recombination function is enabled and may perform a user consent procedure.

The notification that the recombination function is enabled may be provided by outputting the notification as a visual signal or an audible signal by means of an interface 300 of FIG. 1. Furthermore, the apparatus may be subject to user consent (e.g., an OK button input or the like) for the platoon recombination operation and may automatically operate depending on settings of a user setting mode (USM) menu. In this case, the apparatus may support driving in autonomous driving level 3 or above. For a condition of autonomous driving level 2 or below, the apparatus may correct a target speed in a hands-on state or may support platoon recombination by assisting to perform a lane change.

When the user consent is completed, in S109, the apparatus may determine whether there is a new vehicle between the old string and the new string.

When there is no new vehicle, in S110, the apparatus may control the new string to approach the old string and perform recombination. FIG. 2 is a drawing illustrating a view of division and recombination control during platooning according to an embodiment of the present disclosure. Referring to reference numeral 201 of FIG. 2, when there is no obstacle between an old string 211 and a new string 212, the new string 212 may approach the old string 211 to perform recombination.

When there is the new vehicle, in S111, the apparatus may determine whether it is possible for the new vehicle to be included in the string. When it is possible for the new vehicle to be included in the string, in S112, the apparatus may new vehicle in the string to perform recombination control. Referring to reference numeral 202 of FIG. 2, when there is a new vehicle (an obstacle) 213 between the old string 211 and the new string 212 and when it is possible to include the new vehicle 213 on the path, the new string 212 may be recombined with the old string 211 together with the new vehicle 213 when the new string 212 approaches the old string 211.

When the remaining driving path of the new vehicle is the same as a platooning path by a predetermined value (e.g., 80% or more), when there is consent of a user of the new vehicle or consent of an unmanned vehicle, and when the new vehicle meets performance of the system capable of performing platoon autonomous driving, the apparatus may determine that it is possible to include the new vehicle in the string.

When it is difficult for the new vehicle to be included in the string, in S113, a vehicle of the new string may approach the old string to perform recombination by avoiding the new vehicle and making a lane change. In this case, the apparatus may change a platoon form depending on a platooning condition (e.g., the number of lanes or another surrounding vehicle) in the recombination process, such as a lane change. As shown reference numeral 203 of FIG. 2, the new string 212 may avoid the new vehicle 213 to make a lane change to a free lane and may be recombined with the old string 211.

Thereafter, the old string to which a leading vehicle before the string division belongs may become the parent string, and the leading vehicle of the old string may continue playing a role as the leading vehicle after the recombination. Herein, when the leading vehicle of the old string is not located in front of the platoon, a leading vehicle may be reselected among proceeding vehicles depending general items associated with platoon formation and the arrangement of the string may be adjusted. Furthermore, when the new string is traveling in the front of the old string, it may become the parent string for recombination. As shown in reference numeral 204 of FIG. 2, when the new string 212 is traveling in front of the old string 211, the new string 212 may be the parent string for recombination.

The apparatuses of the leading vehicle of the new string and the leading vehicle of the old string may share a location, a driving speed, a lane, platoon information (e.g., the number of vehicles or the number of rows) and may determine the amount of steering control, the amount of driving control, or the amount of braking control of platooning vehicles in the recombination process.

Vehicles of the old string may perform cruise control or may decelerate a target speed within a predetermined value. Furthermore, vehicles of the new string may accelerate and decelerate within a predetermined value from an old target speed or may make a lane change to approach the old string if necessary. In this case, the apparatus of each of the vehicles of the string may display a change in steering, driving, or braking to the user or may notify the user of a change in steering, driving, or braking using a sound or the like.

For example, when a difference between a speed of the vehicles of the new string and a platoon speed of the vehicles of the old string is 20 kph, it is possible to be recombined about 1 minute in a maximum distance (e.g., 300 m).

Furthermore, the apparatuses of the old string and the new string may correct a platoon form during approaching to be easy to perform recombination.

As such, when the string is divided into the old string and the new string due to the occurrence of the event, an embodiment of the present disclosure may recombine the new string with the old string after the occurrence of the event is ended to maintain the existing string, thus increasing efficiency of platooning.

Figure 4:
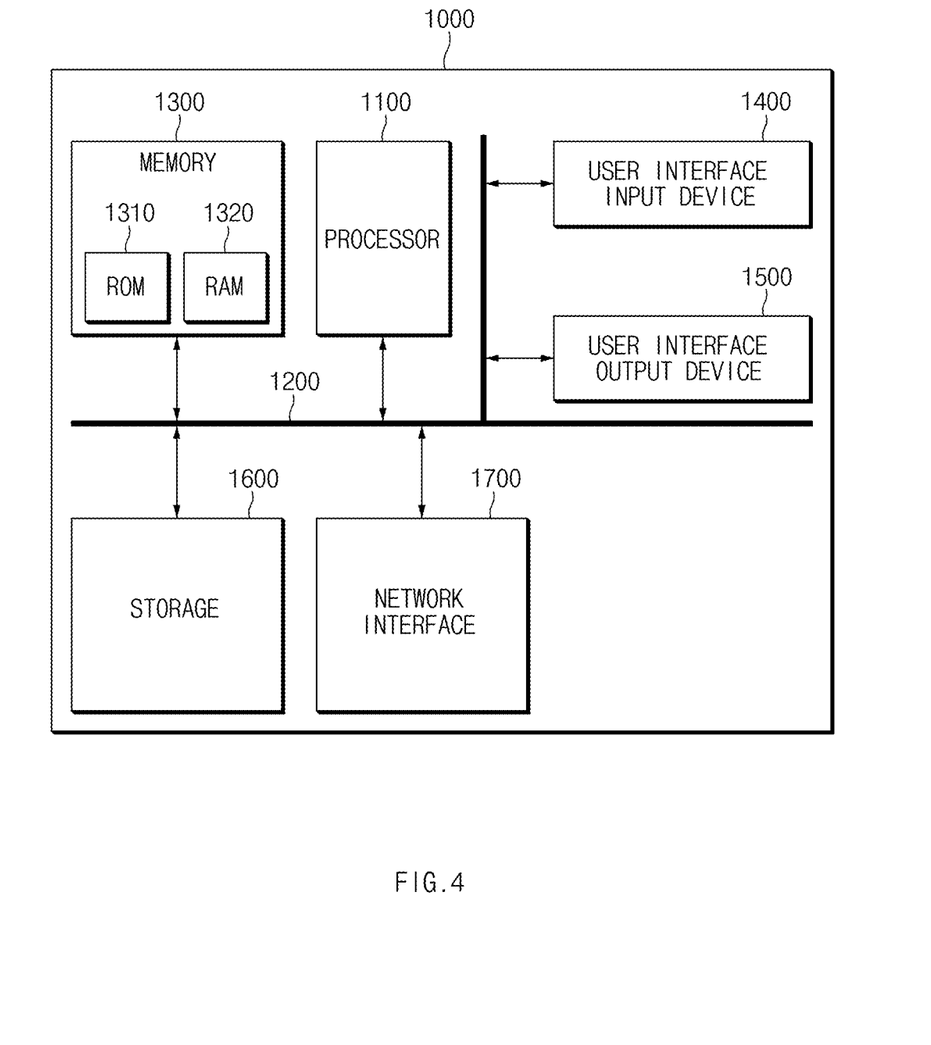
FIG. 4 is a block diagram illustrating a computing system according to an embodiment of the present disclosure.

FIG. 4 is a block diagram illustrating a computing system according to an embodiment of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory and/or the storage) such as a RAM, a flash memory, a ROM, an EPROM, an EEPROM, a register, a hard disk, a removable disk, and a CD-ROM. The storage medium may be coupled to the processor 1100, and the processor 1100 may read information out of the storage medium and may record information in the storage medium. In another embodiment, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may determine a condition where it is possible to recombine divided platoons upon platoon division during autonomous driving and may automatically perform platoon recombination within the range of maintaining traffic flow, thus maintaining advantages of platooning.

In addition, various effects ascertained directly or indirectly through the present disclosure may be provided.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the specific embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:
1. A platooning controller, comprising:
a processor configured to, when an original string comprising an original leading vehicle is divided into an old string and a new string in response to occurrence of a situation requiring a division of the original string during platooning, recombine the old string and the new string in response to occurrence of a situation allowing a recombination of the old string and the new string; and
a storage storing data and an algorithm run by the processor,
wherein the processor is configured to
   determine a condition where it is possible to recombine the old string and the new string,
   control recombination between the old string and the new string,
   determine whether it is possible for a new vehicle to merge with a string, when there is the new vehicle between the old string and the new string, and
   control the new string to avoid the new vehicle by making a lane change and be recombined with the old string, when the new vehicle fails to merge with the string,
wherein vehicles of the old string are configured to travel independently from vehicles of the new string, and
wherein the old string includes the original leading vehicle and the new string includes a lead vehicle different from the original leading vehicle.

2. The platooning controller of claim 1, wherein the condition where it is possible to recombine the old string and the new string includes at least one of: whether an obstacle or a forward collision-avoidance assist (FCA) condition does not occur; a condition for a distance between the old string and the new string; a condition for a traffic congestion level; or a condition for the number of free lanes.

3. The platooning controller of claim 2, wherein the processor determines whether the obstacle or the FCA condition does not occur, using at least one of whether there is the obstacle, whether a driving safety function operates, or whether the autonomous driving function operates.

4. The platooning controller of claim 2, wherein the processor determines that the condition is met, when the distance between the old string and the new string is less than a predetermined value.

5. The platooning controller of claim 2, wherein the processor determines that the condition is met, when the new string is within a distance where it is possible for the new string to reach the old string by accelerating and decelerating in a speed limit of a road where the new string is currently traveling or making a lane change.

6. The platooning controller of claim 2, wherein the processor determines that the condition is met, when the number of free lanes is greater than or equal to a predetermined number.

7. The platooning controller of claim 1, wherein the processor notifies a user that a recombination function is enabled and receives consent from the user, when it is determined that the condition is met.

8. The platooning controller of claim 1, wherein the processor determines an amount of steering control, an amount of driving control, and an amount of braking control of platooning vehicles of the old string and the new string based on at least one of a location, a driving speed, a lane, or platoon information of each of the vehicles of the old string and the new string, when controlling the recombination.

9. The platooning controller of claim 1, wherein the processor controls the new string to reach the old string and perform the recombination when there is no new vehicle between the old string and the new string, when controlling the recombination.

10. The platooning controller of claim 1, wherein the processor determines whether it is possible for the new vehicle to merge with the string, based on at least one of sameness between the remaining driving path of the new vehicle and the remaining driving path of the string, consent of a user of the new vehicle or consent of an unmanned system, or platoon autonomous driving performance of a system.

11. The platooning controller of claim 1, wherein the processor controls the new string to include the new string and be recombined with the old string, when the new vehicle merges with the string.

12. The platooning controller of claim 1, wherein the processor controls a leading vehicle of the new string to play a role as a leading vehicle of the recombined string or reselects a leading vehicle when the old string and the new string are recombined, the new string is traveling in front of the old string, and there is no new vehicle between the old string and the new string.

13. The platooning controller of claim 1, wherein the processor controls a leading vehicle of the old string to play a role as a leading vehicle of the recombined string, after the recombination between the old string and the new string is completed.

14. A platooning control method, comprising:
determining whether occurrence of a situation allowing a recombination of an old string and a new string exists, when an original string is divided into the old string and the new string in response to the occurrence of a situation requiring a division of the original string during platooning;
determining a condition where it is possible to recombine the old string and the new string in response to the occurrence of the situation allowing the recombination of the old string and the new string;
controlling recombination between the old string and the new string, when the condition is met;
determining whether it is possible for a new vehicle to merge with a string, when there is the new vehicle between the old string and the new string; and
controlling the new string to avoid the new vehicle by making a lane change and be recombined with the old string, when the new vehicle fails to merge with the string,
wherein vehicles of the old string are configured to travel independently from vehicles of the new string, and
wherein the old string includes the original leading vehicle and the new string includes a lead vehicle different from the original leading vehicle.

15. The platooning control method of claim 14, wherein the determining of the condition includes:
determining that the condition is met, when at least one of: whether an obstacle or a forward collision-avoidance assist (FCA) condition does not occur; a condition for a distance between the old string and the new string is met; a condition for a traffic congestion level is met; or a condition for the number of free lanes is met.

16. The platooning control method of claim 14, further comprising:
notifying a user that a recombination function is enabled and receiving consent from the user, when it is determined that the condition is met.

17. The platooning control method of claim 14, wherein the determining of the condition includes:
determining the condition is met, when the distance between the old string and the new string is less than a predetermined value;
determining the condition is met, when the new string is within a distance where it is possible for the new string to reach the old string by accelerating and decelerating in the speed limit of the road where the new string is currently traveling or making a lane change;

determining the condition is met based on navigation; or determining the condition is met, when the number of free lanes is greater than or equal to a predetermined number.

* * * * *